Oct. 20, 1959     I. J. KRCHMA     2,909,411
PRODUCTION OF SILICON
Filed Jan. 15, 1957
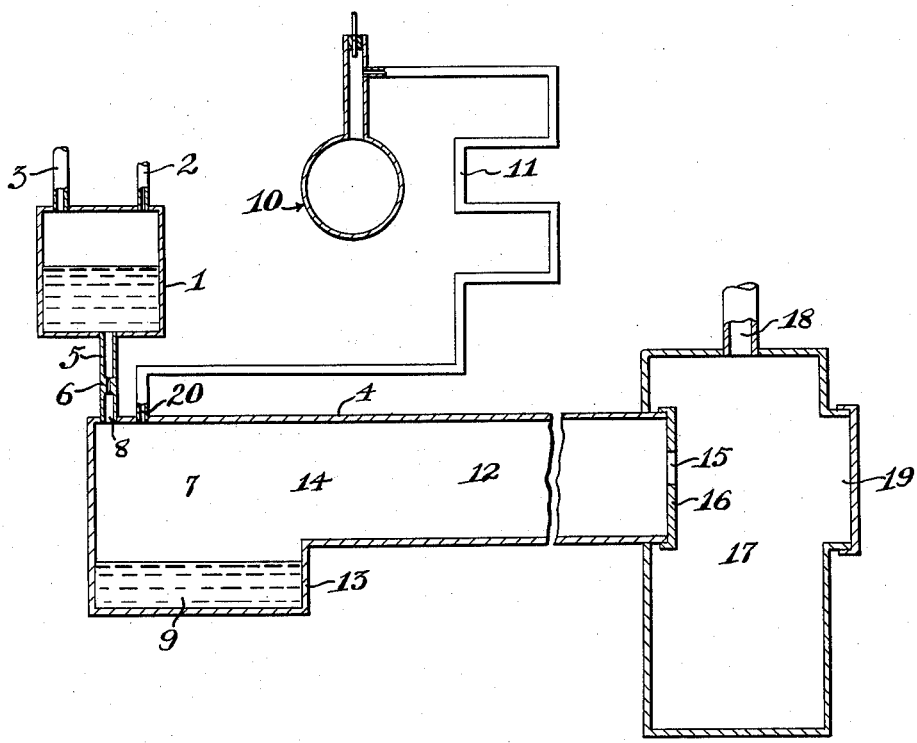
INVENTOR
IGNACE J. KRCHMA
BY
ATTORNEY

United States Patent Office 2,909,411
Patented Oct. 20, 1959

2,909,411

PRODUCTION OF SILICON

Ignace Joseph Krchma, Wilmington, Del., assignor to E. I. du Pont de Nemours and Company, Wilmington, Del., a corporation of Delaware Application January 15, 1957, Serial No. 634,381

8 Claims. (Cl. 23—223.5)

This invention relates to the preparation of elemental hyperpure silicon. More particularly, it relates to novel methods for removing trace impurities from elemental zinc metal used as a reductant for a silicon halide in a vapor phase process for the preparation of hyperpure silicon.

One of the best methods for producing silicon of extremely high purity is by the vapor phase reduction of redistilled silicon tetrachloride with a high purity (99.99%) commercial grade of zinc or cadmium. A factor which influences the quality of the end product silicon is, of course, the purity of the initial reactants, and considerable research has been devoted to the development of methods for keeping impurities out of the reaction zone. The present invention is directed to a novel process which removes trace contaminants from reactants just prior to the latter's entry into the reaction zone.

It is among the objects of this invention to provide an improvement in the process for producing hyperpure elemental silicon through the vapor phase reduction of relatively pure silicon halide with a vaporous, elemental metal reductant, such as zinc or cadmium. A further object is to produce hyperpure elemental silicon which exhibits improved electrical semiconductor qualities. A particular object is to effect such production from high purity zinc and silicon tetrachloride. Other objects will be evident from the ensuing description of my invention and the accompanying diagrammatic drawing of one form of apparatus in which the invention may be carried out.

These objects are attained by a novel method of purifying the reactants used in the well-known vapor phase reduction of a silicon halide with zinc or cadmium to produce elemental silicon. This vapor phase reduction is accomplished by supplying vaporous silicon halide and vaporous reductant metal, i.e., zinc or cadmium, to an enclosed reaction zone maintained at a temperature above the boiling point of the reductant metal and below the melting point of silicon, whereupon reduction of the halide takes place and silicon is deposited. The improvment of this invention comprises the use of an enclosed purification zone at the entrance to the reduction reaction zone to effect a final purification of the reactants. This purification zone is in communication with the reduction reaction zone, and it is partially filled with a pool of boiling reductant metal supplying vapors to the reduction reaction zone. Purification of the reactants is brought about by introducing into the purification zone molten reductant metal at a rate sufficient to maintain the pool of boiling reductant metal while passing a stream of silicon halide vapors at a temperature of at least 600°C. through said purification zone to intermingle with reductant metal before passing them into the reduction reaction zone.

The introduction of the molten reductant metal and the silicon halide vapor in this manner removes trace contaminants which otherwise would enter the main reaction chamber and contaminate the silicon. It is believed that these trace contaminants are removed by adsorption on the small amount of silicon which inherently forms as a result of the intermingling of the reactants.

In a preferred process of this invention, the reaction and the purification zones are enclosed by silica, the silicon halide is silicon tetrachloride, and the reductant metal is zinc, each of the reactants being of such purity as to contain only trace contaminants.

Referring to the drawing, there is shown an apparatus which may be used to carry out this invention. This apparatus may be constructed of fused silica or other desired corrosion-resistant material. Each element or section of the apparatus is joined to its adjacent element by welding or seals made with the best grade of asbestos. Reductant metal can be continuously or intermittently charged into reservoir 1 via its inlet 2. The latter also serves as an outlet means through which an inert gas (usually dry nitrogen or argon which blankets the metal within the reservoir and protects it against atmospheric contamination) can be withdrawn. The reservoir 1 can be provided with associated furnacing or electrical heating means (not shown) adapted to maintain the reductant metal charged thereto in molten state and at temperature ranging from between the melting point to as close as possible to the boiling point of such metal. In the case of zinc, the temperature preferably ranges from 800° C.–900° C., although it can range from 419° C. to 907° C. In the instance of cadmium, the range can be from about 321° C. to 765° C., and preferably ranges from 700° C.–760° C. Inert gas charged to the system is fed thereto via an inlet 3 in communication with a source of supply and pressure control means (not shown). The reservoir 1 is positioned above a reactor 4 also adapted to be heated to and maintained at any desired temperature by suitable zonal heat control means (not shown), and is provided with a bottom outlet conduit 5 in which a restriction 6 of the proper size exists whereby molten metal reductant metal can be fed by gravity into purification zone 7 of reactor 4 at any desired rate of flow. While this rate will depend upon the size of the reactor, the available heat input thereto, the rate of silicon halide flow to said reactor and like factors, in my preferred embodiment which employs molten zinc I maintain a flow rate of between 30 and 40 grams of zinc per minute. The conduit 5 is also disposed within furnacing or heating means (not shown) to facilitate entrance of the stream of molten zinc or cadmium into the purification zone 7 at the outlet point 8 at the desired temperature. The rate of reductant metal flow is adjusted to initially provide a molten metal pool 9 at the bottom of the purification reaction zone 7. The purification zone 7 is heated so as to maintain evaporation of zinc or cadmium from the pool 9 at about the same rate as said zinc is charged thereto, thus maintaining the pool at approximately constant in volume. At the same time silicon halide from the silica vaporizer 10 (preferably silicon tetrachloride vapor which has been purified to remove as much of the trace impurities as possible) is passed into purification zone 7 via conduit 11 and inlet 20. Conduit 11 is positioned within a suitable furnace (not shown) to maintain the temperature of the tetrachloride to at least above 600° C., and preferably to a temperature within the range of about 800°C.–1000°C. The conduit and the furnace are also referred to as the silicon tetrachloride preheater. Within the zone 7, a portion of the total silicon tetrachloride required reacts with the zinc or cadmium to form silicon particles which are retained within and about the molten pool 9. Reductant metal vaporized from this molten pool has a much lower impurity content than the incoming metal from the reservoir 1. Thus, purified reductant metal vapor along with unreacted silicon tetrachloride vapor and reductant metal chloride vapor passes into a main reduction reaction zone 12 maintained below the melting point of silicon. When zinc is employed as a reactant, temperatures ranging from about 907° C.–1100° C. are conventional. The reaction zone 12 is made up of a cylindrical chamber relatively smaller in diameter than the purification zone 7 so as to form a pocket or well 13 for retaining the molten metal pool 9 within the purification reaction zone 7. This construction enables the mixed vapors from the purification zone 7 to directly enter the main reduction reaction zone 12 at the point 14. Silicon is deposited in zone 12, as a result of the reaction of silicon tetrachloride vapor with the vaporized and purified zinc or cadmium. Reaction product zinc chloride and the like are passed in the vapor state to the by-product collecting chamber 17 through a restricted outlet 15 in the removable cap 16 at the exit end of the reaction zone. Excess silicon tetrachloride present is removed from collection chamber 17 through outlet 18 and is passed to a condenser (not shown) for recovery and reuse. When the reaction zone 12 becomes almost completely filled with the elemental silicon product, reductant metal feed is stopped, and said zone is continued to be maintained at said 907°C–1100°C. temperature for one or two hours while the silicon tetrachloride is passed through the reactor. The apparatus is then cooled to a temperature ranging from about 50°C.–200°C., and the silicon product is removed from the reaction zone by means of a scraper, or rake or other suitable means through an outlet 19 in the wall of the chamber 17 opposite the removable cap 16. The molten pool 9 of silicon-containing metal reductant can be discarded, or if preferred, more than one run may be made therewith. In the latter event the pool is preferably frozen through cooling treatment during the removal of the silicon product from the main reduction zone 12.

To a clearer understanding of the invention, the following specific examples are given. These are merely illustrative of and are not in limitation of my invention.

*Example I*

Employing a zonal reactor system of the type shown in the drawing, redistilled silicon tetrachloride is reacted with 99.99% purity zinc to obtain hyperpure silicon. The apparatus is constructed of fused silica with its purification reaction zone 7 being two feet long and 12 inches in diameter and its main reduction zone 12 being six feet in length and 6 inches in diameter. The apparatus is first heated to constant reaction conditions prior to feeding the reactants thereto. Flushing with dry argon gas is also resorted to at this time to eliminate moisture, oxygen and other unwanted gaseous contaminants. The temperatures of the various parts of the reactor throughout the period of reaction are as follows:

| | ° C. |
|---|---|
| Zinc feed reservoir | 800 |
| Feed line, molten zinc | 900 |
| Silicon tetrachloride vaporizer | 57 |
| Silicon tetrachloride preheater | 950 |
| Purification reaction zone | 907 |
| Main reduction reaction zone | 950 |

A flow of molten zinc to the purification reaction zone (40 grams per minute) is maintained by intermittent addition of high purity zinc rod to the zinc feed reservoir 1, which has a stream of dry, pure nitrogen passing through the vapor space above the metal. A pool of molten zinc is allowed to build up within the purification zone of the reactor before starting the flow of silicon tetrachloride vapor thereto, approximately 4000 grams of zinc being fed during this period. Silicon chloride vapor from the vaporizer is then passed through the preheater at the rate of 35–40 cc./min. (liquid). Some deposition of silicon occurs within the purification zone 7, but about 80% of the silicon tetrachloride passes into the main reduction reaction zone 12 along with the zinc vaporized from the pool.

The silicon product which deposits within the main reactor, and unreacted tetrachloride and zinc vapor as well as reaction by-products are removed from the reactor in the vaporized state and passed into the by-product collection chamber which is fitted with a condenser for trapping silicon tetrachloride. After a reaction period of about 40 hours, the main vapor phase reduction reaction zone became almost filled with the elemental silicon product. At this time, the zinc feed is stopped and the purification reaction zone temperature is lowered to stop evaporation of zinc from the pool. After an hour, the silicon chloride feed is discontinued, and thereafter all other temperatures are gradually lowered, with cooling being continued until about room temperature is reached in the reaction zone. The hyperpure product silicon is then removed from the reactor. This extremely high purity silicon product (99.99+%  purity) has a resistivity of 200 ohm centimeters and a lifetime of 300 microseconds. If the same reactants (i.e., reactants from the batches which supplied the $SiCl_4$ and Zn for the process just described) are used in a process which eliminates the purification zone containing the molten zinc, the silicon product (99.99+%) after completion of a 40-hour reaction period has a resistivity of 75 ohm centimeters and a lifetime of 90 microseconds. This latter process is exemplary of the prior art procedure, and it is accomplished in the reactor shown in the accompanying drawing. The rates and temperatures of this latter procedure are the same as those set forth above. The purification zone is eliminated by maintaining the entire reactor, including the purification zone 7, at the main reaction zone temperature of about 950°C. The higher resistivity and lifetime exhibited by the product produced according to the process of this invention is indicative of the fact that trace impurities which lower such characteristics have been removed in the purification zone. Moreover, these higher semi-conductor characteristics are indicative of a silicon which is better suited for use in such electronic devices as transistors and rectifiers. Measurement of the resistivity (reciprocal of conductivity) of these silicon products is made in accordance with the methods described by Stephen James Angello in the Physical Review, pages 371–377, vol. 62, second series, Nos. 7 and 8, October 1 and 15, 1942, published by the American Institute of Physics, Inc., New York. Lifetime and resistivity measurements are made on a single crystal drawn from a melt of the product silicon. The method for measuring lifetime described by Haynes and Hornbeck in Physical Review, vol. 90, p. 152 (1953), is used for the determinations made herein.

*Example II*

Using a zonal reactor system of the type employed in Example I, that example is duplicated except that a divided stream of heated silicon tetrachloride is charged to the reactor, i.e., both at the outlet 20 and to the intermediate point 14 of said reactor. This is carried out so that approximately 10–20% of the heated silicon tetrachloride would enter the purification reaction zone, as in Example I, while the remainder thereof is simultaneously passed into the reactor and directly into the main reduction reaction zone 12. The silicon tetrachloride passing over the pool of molten zinc within the purification zone 7 is largely reacted to form silicon, which remains as crystals in and about the molten pool of zinc through the period of continuous reaction. The portion of the silicon tetrachloride which passes directly into the main vapor phase reduction reactor is there reacted, with the yield being about 50% based on the total silicon tetrachloride fed to the reactor. After about 40 hours of continuous operation the main reduction reaction zone is filled with hyperpure elemental silicon product, at which point the zinc feed is discontinued and said main zone is maintained at reaction temperature in the presence of silicon tetrachloride for a short period. The reactor is then cooled to room temperature and the hyperpure elemental silicon product deposited therein is recovered and found to be highly suitable for semiconductor uses, such as in rectifiers and transistors.

*Example III*

Example I is duplicated employing the same type of apparatus used in that example but instead of introducing the silicon tetrachloride into the purification reaction zone the apparatus is modified to effect the introduction at a point below the surface of the pool of molten zinc. The product silicon recovered is also found to be highly suitable for transistor and other hypercritical electronic uses.

*Example IV*

Example I is duplicated, except that in lieu of zinc being used as a reductant cadmium is employed, with 70 grams per minute of the molten reductant being fed to the purification reaction zone. The various parts of the reactor are at the following temperatures during the run:

|  | ° C. |
|---|---|
| Cadmium feed reservoir | 700 |
| Feed line, molten cadmium | 760 |
| Silicon tetrachloride vaporizer | 57 |
| Silicon tetrachloride preheater | 950 |
| Purification reaction zone | 767 |
| Main reduction reaction zone | 950 |

From this operation a high quality, transistor grade silicon product is recovered.

The deposition of silicon on and about the molten zinc pool, as a result of the reaction of the silicon tetrachloride with molten zinc, appears to provide highly active adsorptive surfaces which permanently remove trace contaminants from the zinc, thus allowing a purer material to pass to the main reaction zone. Moreover, the use of the reductant metal immediately after it is purified eliminates the possibility of recontamination. It also appears probable that trace impurities present in the silicon tetrachloride vapor are captured by the freshly formed silicon in the purification zone.

According to the accompanying drawing, the silicon halide vapor is charged into the reactor 4 from a single inlet 20. However, as described in Examples II and III, it is possible to introduce the vapor from a plurality of inlets to different sections of the reactor. Thus, portions of the total silicon halide vapor can be fed in separate streams from either the same or separate vaporizers to both zone 7 and to the entrance 14 of the main reduction reaction zone 12. Alternatively, all or a portion of the halide vapor can be bubbled through the pool of molten reductant metal 9 and then passed into the main reaction zone 12.

The rate of flow of silicon halide to the main reaction zone is based on the stoichiometric relationship of silicon halide to the reductant metal. A slight excess of halide in the order of 5% to 10% by weight, is preferred. It is also pointed out that a stoichiometric excess or deficiency of silicon halide, up to about 50% by weight, can be used if desired. As already indicated, cadmium is considered the equivalent of zinc in my improved process. When cadmium is employed, necessary adjustment of temperature can be effected in the purification zone to accord with the lower boiling point of this metal.

Although silicon tetrachloride is the preferred silicon halide, the invention is applicable to the other silicon halides, such as silicon tetrachloride, disilicon hexachloride, silicon tetrabromide, disilicon tetrabromide, silicon tetraiodide and the like.

If desired, an inert carrier gas (such as nitrogen, argon, or other gas from the eighth group of the periodic table) can be used to control reaction conditions and to assist in conveying the reactants through one or all of reaction zones.

Removal of product silicon from the reaction chamber without stopping the flow of reactants can be accomplished by means of an alternating reaction chamber arrangement. When silicon is to be recovered from a particular chamber, the flow of reactants is directed to an alternate chamber. The silicon product is usually cooled before it is recovered. Temperatures below 200° C. are convenient for this operation.

The process of this invention offers the advantage of producing a purer and better semiconductor grade of silicon. The formation of the silicon particles within the confines of the purification zone and in the molten reductant metal phase effects trace impurity adsorption from the metal and the halide just prior to the reduction reaction so that elemental silicon of the highest purity is produced.

Since it is obvious that many changes and modifications can be made in the above-described details without departing from the nature and spirit of the invention, it is to be understood that the invention is not to be limited to said details except as set forth in the appended claims.

This application is a continuation-in-part of my co-pending application Serial No. 466,823, filed November 4, 1954, now abandoned.

I claim:

1. In a process for producing elemental silicon of hyperpurity by passing silicon halide vapors and vapors of a reductant metal selected from the group consisting of zinc and cadmium into an enclosed reduction reaction zone maintained at a temperature above the boiling point of the reductant metal and below the melting point of silicon, whereupon a reduction reaction takes place to deposit silicon in said reaction zone, the improvement which comprises maintaining an enclosed purification zone in communication with the entrance to said reduction reaction zone, said purification zone being partially filled with a pool of boiling reductant metal supplying vapors to the reduction reaction zone, introducing into the purification zone molten reductant metal at a rate sufficient to maintain the pool of boiling reductant metal while passing a stream of silicon halide vapors at a temperature of at least 600° C. through said purification zone to intermingle with reductant metal before passing said halide vapors into the reduction reaction zone.

2. The process of claim 1 in which the silicon halide is silicon tetrachloride and the reductant metal is zinc.

3. The process of claim 1 in which the silicon halide is silicon tetrachloride and the reductant metal is cadmium.

4. In a process for producing elemental silicon of hyperpurity by passing silicon halide vapors and vapors of a reductant metal selected from the group consisting of zinc and cadmium into an enclosed reduction reaction zone maintained at a temperature above the boiling point of the reductant metal and below the melting point of silicon, whereupon a reduction reaction takes place to deposit silicon in said reaction zone, said silicon halide and reductant metal containing only trace contaminants, the improvement which comprises maintaining an enclosed purification zone in communication with the entrance to said reduction reaction zone, said purification zone being partially filled with a pool of boiling reductant metal supplying vapors to the reduction reaction zone, introducing into the purification zone molten reductant metal at a rate sufficient to maintain the pool of boiling reductant metal while passing a stream of silicon halide vapors at a temperature of at least 600° C. through said purification zone to intermingle with reductant metal before passing said halide vapors into the reduction reaction zone.

5. In a process for producing elemental silicon of hyperpurity by passing silicon halide vapors and vapors of a reductant metal selected from the group consisting of zinc and cadmium into an enclosed reduction reaction zone maintained at a temperature above the boiling point of the reductant metal and below the melting point of silicon, whereupon a reduction reaction takes place to deposit silicon in said reaction zone, said silicon halide and reductant metal containing only trace contaminants, the improvement which comprises maintaining an enclosed purification zone in communication with the entrance to said reduction reaction zone, said purification zone being partially filled with a pool of boiling reductant metal supplying vapors to the reduction reaction zone, introducing into the purification zone molten reductant metal at a rate sufficient to maintain the pool of boiling reductant metal while passing at least a portion of said stream of silicon halide vapors at a temperature of at least 600° C. through said purification zone to intermingle with reductant metal before passing said halide vapors into the reduction reaction zone.

6. In a process for producing elemental silicon of hyperpurity by passing a stream of silicon halide vapors and vapors of a reductant metal selected from the group consisting of zinc and cadmium into a reduction reaction zone enclosed with silica and maintained at a temperature of about 907° C.–1100° C., whereupon a reduction reaction takes place to deposit silicon in said reaction zone, said silicon halide and reductant metal containing only trace contaminants, the improvement which comprises maintaining a purification zone enclosed with silica in communication with the entrance to said reduction reaction zone, said purification zone being partially filled with a pool of boiling reductant metal supplying vapors to the reduction reaction zone, introducing into the purification zone molten reductant metal at a rate sufficient to maintain the pool of boiling reductant metal while passing said stream of silicon halide vapors at a temperature of about 800° C–1000° C. through said purification zone to intermingle with reductant metal before passing said halide vapors into the reduction reaction zone.

7. The process of claim 6 in which the silicon halide is silicon tetrachloride and the reductant metal is zinc.

8. The process of claim 6 in which the silicon halide is silicon tetrachloride and the reductant metal is cadmium.

References Cited in the file of this patent

Lyon et al.: "J. of Electrochemical Society," vol. 96, No. 6, December 1949, pages 359–363.